United States Patent
Inaba et al.

(10) Patent No.: US 9,113,085 B2
(45) Date of Patent: Aug. 18, 2015

(54) APPARATUS FOR CONTROLLING EXPOSURE AMOUNT OF AN IMAGING DEVICE

(71) Applicant: SOCIONEXT INC., Yokohama-shi, Kanagawa (JP)

(72) Inventors: Tamae Inaba, Yokohama (JP); Seiji Takahashi, Yokohama (JP); Hideaki Miyashita, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/515,872

(22) Filed: Oct. 16, 2014

(65) Prior Publication Data
US 2015/0036017 A1  Feb. 5, 2015

Related U.S. Application Data

(62) Division of application No. 13/211,745, filed on Aug. 17, 2011, now Pat. No. 8,890,967.

(30) Foreign Application Priority Data

Nov. 26, 2010 (JP) .................. 2010-263164

(51) Int. Cl.
*H04N 5/225* (2006.01)
*H04N 5/235* (2006.01)

(52) U.S. Cl.
CPC ............. *H04N 5/2351* (2013.01); *H04N 5/235* (2013.01)

(58) Field of Classification Search
CPC .................................... H04N 5/2351
USPC ........................................ 348/229.1
See application file for complete search history.

(56) References Cited

U.S. PATENT DOCUMENTS 8,035,727 B2 * 10/2011 Okamoto ...................... 348/362

FOREIGN PATENT DOCUMENTS

| JP | 05-122600 | 5/1993 |
|----|-----------|--------|
| JP | 7-298131 | 11/1995 |
| JP | 2001-177757 | 6/2001 |
| JP | 2003-87646 | 3/2003 |
| JP | 2006-324866 | 11/2006 |
| JP | 2006324866 A | 11/2006 |
| JP | 2009-49712 | 3/2009 |

OTHER PUBLICATIONS

Restriction Requirement issued Jan. 6, 2014 in related U.S. Appl. No. 13/211,745.
Office Action issued Mar. 20, 2014 in related U.S. Appl. No. 13/211,745.
Notice of Allowance issued Sep. 8, 2014 in related U.S. Appl. No. 13/211,745.
Japanese Office Action mailed Feb. 4, 2014 in corresponding Japanese Application 2010-263164.
U.S. Appl. No. 13/211,745, filed Aug. 17, 2011, Tamae Inaba et al., Fujitsu Semiconductor Limited.

* cited by examiner

*Primary Examiner* — Gary C Vieaux
(74) *Attorney, Agent, or Firm* — Staas & Halsey LLP

(57) ABSTRACT

An imaging control unit includes: a calculating unit that obtains block brightness-values of a plurality of blocks from each pixel of an image data of a frame, the image data of a frame being divided into the plurality of blocks; a limiting unit that limits to a first limit brightness-value a block brightness-value which is larger than the first limit brightness-value among the plurality of block brightness-values; and a controlling unit that controls an exposure amount of an imaging unit so that a representing brightness-value of the plurality of the block brightness-values correspond to a target brightness-value which is less than first limit brightness-value.

2 Claims, 11 Drawing Sheets

FIG. 9A
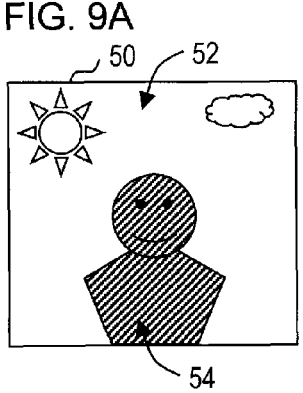
FIG. 9B
| 500 | 150 | 150 | 500 |
|---|---|---|---|
| 500 | 10 | 10 | 150 |
| 500 | 10 | 10 | 150 |
| 150 | 10 | 10 | 150 |
AVERAGE VALUE OF BLOCK
BRIGHTNESS-VALUE: 185
FIG. 9C
| 200 | 150 | 150 | 200 |
|---|---|---|---|
| 200 | 10 | 10 | 150 |
| 200 | 10 | 10 | 150 |
| 150 | 10 | 10 | 150 |
AVERAGE VALUE OF BLOCK
BRIGHTNESS-VALUE: 110
FIG. 9D
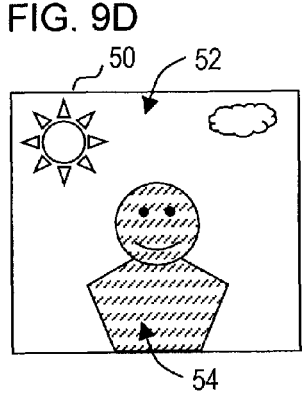
FIG. 9E
| 1000 | 300 | 300 | 1000 |
|---|---|---|---|
| 1000 | 20 | 20 | 300 |
| 1000 | 20 | 20 | 300 |
| 300 | 20 | 20 | 300 |
AVERAGE VALUE OF BLOCK
BRIGHTNESS-VALUE: 370
FIG. 9F
| 200 | 200 | 200 | 200 |
|---|---|---|---|
| 200 | 20 | 20 | 200 |
| 200 | 20 | 20 | 200 |
| 200 | 20 | 20 | 200 |
AVERAGE VALUE OF BLOCK
BRIGHTNESS-VALUE: 132.5
FIG. 9G
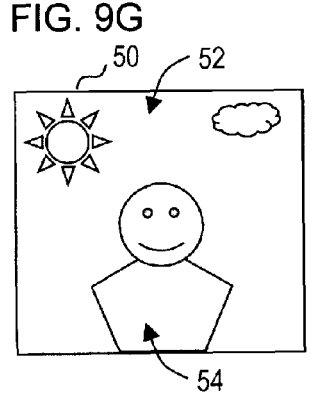
FIG. 9H
| 1023 | 1023 | 1023 | 1023 |
|---|---|---|---|
| 1023 | 160 | 160 | 1023 |
| 1023 | 160 | 160 | 1023 |
| 1023 | 160 | 160 | 1023 |
AVERAGE VALUE OF BLOCK
BRIGHTNESS-VALUE: 699.4
FIG. 9I
| 200 | 200 | 200 | 200 |
|---|---|---|---|
| 200 | 160 | 160 | 200 |
| 200 | 160 | 160 | 200 |
| 200 | 160 | 160 | 200 |
AVERAGE VALUE OF BLOCK
BRIGHTNESS-VALUE: 185

FIG. 10A

| 750 | 800 | 800 | 800 |
|-----|-----|-----|-----|
| 800 | 800 | 800 | 800 |
| 800 | 800 | 800 | 800 |
| 800 | 800 | 800 | 750 |

AVERAGE VALUE OF BLOCK
BRIGHTNESS-VALUE: 793.8

FIG. 10B

| 200 | 200 | 200 | 200 |
|-----|-----|-----|-----|
| 200 | 200 | 200 | 200 |
| 200 | 200 | 200 | 200 |
| 200 | 200 | 200 | 200 |

AVERAGE VALUE OF BLOCK
BRIGHTNESS-VALUE: 200

FIG. 10C

| 650 | 700 | 700 | 700 |
|-----|-----|-----|-----|
| 700 | 700 | 700 | 700 |
| 700 | 700 | 700 | 700 |
| 700 | 700 | 700 | 650 |

AVERAGE VALUE OF BLOCK
BRIGHTNESS-VALUE: 693.8

FIG. 10D

| 200 | 200 | 200 | 200 |
|-----|-----|-----|-----|
| 200 | 200 | 200 | 200 |
| 200 | 200 | 200 | 200 |
| 200 | 200 | 200 | 200 |

AVERAGE VALUE OF BLOCK
BRIGHTNESS-VALUE: 200

FIG. 11A

| 750 | 800 | 800 | 800 |
|-----|-----|-----|-----|
| 800 | 800 | 800 | 800 |
| 800 | 800 | 800 | 800 |
| 800 | 800 | 800 | 750 |

AVERAGE VALUE OF BLOCK
BRIGHTNESS-VALUE: 793.8

FIG. 11B

| 750 | 750 | 750 | 750 |
|-----|-----|-----|-----|
| 750 | 750 | 750 | 750 |
| 750 | 750 | 750 | 750 |
| 750 | 750 | 750 | 750 |

AVERAGE VALUE OF BLOCK
BRIGHTNESS-VALUE: 750

FIG. 11C

| 350 | 400 | 400 | 400 |
|-----|-----|-----|-----|
| 400 | 400 | 400 | 400 |
| 400 | 400 | 400 | 400 |
| 400 | 400 | 400 | 350 |

AVERAGE VALUE OF BLOCK
BRIGHTNESS-VALUE: 393.8

FIG. 11D

| 350 | 350 | 350 | 350 |
|-----|-----|-----|-----|
| 350 | 350 | 350 | 350 |
| 350 | 350 | 350 | 350 |
| 350 | 350 | 350 | 350 |

AVERAGE VALUE OF BLOCK
BRIGHTNESS-VALUE: 350

APPARATUS FOR CONTROLLING EXPOSURE AMOUNT OF AN IMAGING DEVICE

CROSS-REFERENCE TO RELATED APPLICATION

This application is a divisional of U.S. application Ser. No. 13/211,745, filed on Aug. 17, 2011, and is based upon and claims the benefit of priority of the prior Japanese Patent Application No. 2010-263164, filed on Nov. 26, 2010, the entire contents of which are incorporated herein by reference.

FIELD

Embodiments discussed herein relate to an imaging control unit for outputting a controlling signal to control an exposure amount of an imaging unit, an imaging apparatus having an imaging control unit, and a method for controlling an imaging apparatus.

BACKGROUND

In an imaged image of a backlight scene, which is obtained by an imaging of an object being performed against the light source behind the object, the object has a lower brightness compared with the background. Therefore, for example, in case that an imaging apparatus such as a digital still camera and the like displays an imaged image as a finder image, it is difficult to identify a detailed contour of the object. For such a case, a method is proposed, for obtaining a preferable imaged image data which has an appropriate brightness by, for example, controlling the exposure amount. Or, another method is proposed for generating a preferable imaged image data by an image processing. Related descriptions are found in Japanese Laid-open Patent Publications No.H7-298131, No.2003-87646, and No.2009-49712.

In one example of generating an imaged image data by an image processing, by generating an image data in which the brightness of a part of the object is corrected and an image data in which the brightness of a part of the background is corrected from an imaged image data of one frame, and by combining those, an imaged image data, of which the object and the background each has an appropriate brightness, is generated. Or, in another example, by imaging a plurality of images having different exposure amounts, and by combining an image data, which is imaged with an exposure amount most appropriate to the object (referred to as the optimal exposure amount hereinafter), and an image data, which is imaged with an exposure amount most appropriate to the background, imaged image data, in which the object and the background each has an appropriate brightness, is generated.

However, for the imaging apparatus, in displaying the finder image and the like, a fast processing is desired. On the other hand, there is a demand for a low cost. Therefore, even for obtaining a preferable imaged image data, a process with a large lord is unpreferable.

SUMMARY

An imaging control unit in accordance with an embodiment includes: a calculating unit that obtains block brightness-values of a plurality of blocks from each pixel of an image data of a frame, the image data of a frame being divided into the plurality of blocks; a limiting unit that limits to a first limit brightness-value a block brightness-value which is larger than the first limit brightness-value among the plurality of block brightness-values; and a controlling unit that controls an exposure amount of an imaging unit so that a representing brightness-value of the plurality of the block brightness-values correspond to a target brightness-value which is less than first limit brightness-value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 9A-9I are drawings for illustrating the exposure amount control process in case of the backlight scene;

FIGS. 10A-10D are drawings for illustrating a normal exposure amount control process in the high-brightness scene; and FIGS. 11A-11D are drawings for illustrating the exposure amount control process in the high-brightness scene according to another embodiment.

DESCRIPTION OF EMBODIMENTS

Embodiments will be described hereinafter according to the drawings. However, it is noted that the technical scope is not limited to the embodiments described below, but covers the matters described in the claims and the equivalents thereof.

Figure 1:
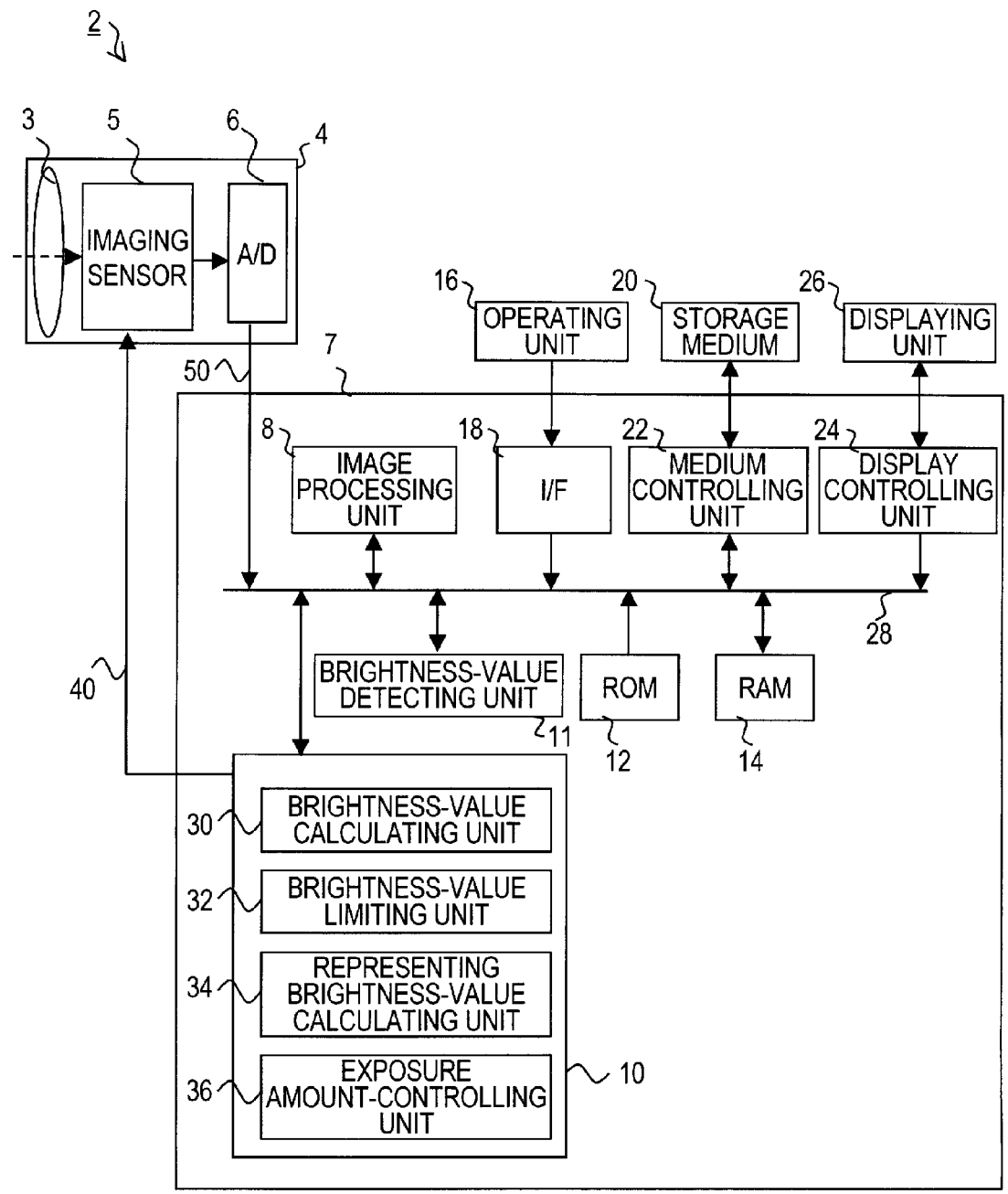
FIG. 1 is a drawing for illustrating an exemplary configuration of an imaging apparatus.

FIG. 1 is a drawing for illustrating an exemplary configuration of an imaging apparatus in accordance with one embodiment. The imaging apparatus 2 has an imaging unit 4 for imaging an object and for outputting the imaged image data, and an imaging control unit 7 for controlling an exposure amount of the imaging unit 4 according to the imaged image data. The imaging apparatus 2 is, for example, a digital still camera.

The imaging unit 4 converts a light from the object incoming through an imaging lens unit 3 into pixel value signals by an imaging sensor 5, generates from the pixel value signals the imaged image data, and outputs it. The imaging lens unit 3 has, for example, a plurality of single focus lenses, and has a focal distance according to a combination thereof. The imaging lens unit 3 forms an object image, according to the focal distance, on an acceptance surface of the imaging sensor 5. The imaging sensor 5 converts the light accepted by 2-dimensionally arranged photoelectric conversion elements into the pixel value signals, and outputs the pixel value signals of one frame in order of raster scan. The imaging sensor 5 includes, for example, a CCD (Charge Coupled Device) sensor, or a CMOS (Complementary Metal Oxide Semiconductor) sensor. An A/D (Analog to Digital) converter 6 converts the pixel value signal output from the imaging sensor 5 into the imaged image data, by digitizing it. The imaged image data includes, for example, RGB (Red, Green, and Blue) gradation data for each pixel. The imaged image data is input into the imaging control unit 7.

The imaging control unit 7 is, for example, a system LSI including an image processing unit 8, a CPU (Central Processing Unit) 10, a brightness-value detecting unit 11, a ROM (Read Only Memory) 12, and a RAM (Random Access Memory) 14, which are connected by a bus 28. The imaging control unit 7 may further have, for example, an interface unit 18, a medium controlling unit 22, and a display controlling unit 24. To the interface unit 18, the medium controlling unit 22, and the display controlling unit 24, an operating unit 16, a storage medium 20, and a displaying unit 26 are connected.

The imaged image data 50 input from the imaging unit 4 is stored in the RAM 14. The image processing unit 8 performs an image processing to the imaged image data 50 stored in the RAM 14. The image processing includes, for example, a conversion process from an RGB data into a YCbCr (brightness/color difference) data, a correcting process of a color and a brightness, a denoising process, a contour enhancement process, a format conversion process for data compression, an image processing to minify a frame of the imaged image data 50 for generating an image data to be displayed in a finder, and the like. The brightness-value detecting unit 11 detects the brightness value of each pixel of the imaged image data 50. The brightness-value is, for example, the Y value in YCbCr data.

The CPU (Central Processing Unit) 10 calculates a control amount of the exposure amount so that the brightness-value of the entire imaged image data 50 corresponds to the target brightness value, and outputs to the imaging unit 4 a exposure amount controlling signal 40 indicating such the control amount. From the imaged image data 50 of a pixel in a frame, for example, a block brightness-value of a plurality of blocks, which the frame is divided into is calculated. Then, the entire imaged image data 50 is obtained as the representative brightness-value of the block brightness value. This process will be explained in detail below.

The target brightness-value is, for example, a brightness-value, which is arbitrarily obtained by an experiment and the like and corresponds to the optimal exposure amount. For example, for a dynamic range of the brightness-value being 0% to 100% from the low-brightness side to the high-brightness side, the target brightness-value is set around 20%. In case that the brightness-value of the entire imaged image data 50 is greater than the target brightness value, the exposure amount of the imaging unit 4 is greater than the optimal exposure amount corresponding to the target brightness value. In that case, CPU 10 generates the exposure amount controlling signal 40 for decreasing the exposure amount to the optimal exposure amount, and outputs it to the imaging unit 4. On the other hand, in case that the brightness-value of the entire imaged image data 50 is less than the optimal brightness value, the exposure amount of the imaging unit 4 is less than the optimal exposure amount. In that case, CPU 10 generates the exposure amount controlling signal 40 for increasing the exposure amount to the optimal exposure amount, and outputs it to the imaging unit 4. Such the exposure amount control process is performed by each of the brightness-value calculating unit 30, the brightness-value limiting unit 32, the representing brightness-value calculating unit 34, and the exposure amount-controlling unit 36. The operation of each of these will be explained in detail below.

The brightness-value calculating unit 30, the brightness-value limiting unit 32, the representing brightness-value calculating unit 34, and the exposure amount controlling unit 36 correspond to, for example, the CPU 10 performing processing programs corresponding to each process. The processing programs are stored, for example, in the ROM 12. The CPU 10 stores the processing program and data in the RAM 14, and performs each process.

The imaging unit 4, being input the exposure amount controlling signal 40 according to the imaged image data 50 of the frame number n (n is a positive integer), in response thereto, adjusts the exposure amount of imaging at a frame number n+1 (or the frame number n+2 and after). The imaging unit 4 adjusts the exposure amount by a method, such as, for example, adjusting the shutter speed. The shutter of the imaging unit 4 may be either an electronic shutter or a mechanical shutter. In case of an electronic shutter, the shutter speed is controlled by controlling a storing time of an electrical charge by a photoelectric conversion element. Or, in case of a mechanical shutter, an open/close speed of the mechanically opening/closing shutter is controlled.

Further, the operating unit 16 receives an operation input by a user, and inputs the imaging control unit 7 a controlling signal corresponding to the operation. The operating unit 16 has, for example, various kinds of operating buttons and a control circuit thereof. The controlling signal from the operating unit 16 is transferred to the CPU 10 through the interface unit 18. The CPU 10 controls, in response to this, according to the controlling program stored in the ROM 12, operations of the imaging unit 4, as well as of the display controlling unit 24, the medium controlling unit 22, and the like. Thereby, for example, the display controlling unit 24 displays the imaged image data 50 as a finder image at the displaying unit 26. The displaying unit 26 includes, for example, an LCD (Liquid Crystal Display). Also, the medium controlling unit 22 stores the imaged image data 50 into the storage medium 20, and reads out the imaged image data 50 stored in the storage medium 20. The storage medium 20 includes, for example, a hard disk drive, or an attachable/detachable portable storage medium such as a memory card and the like.

Next, the exposure amount control process of the imaging control unit 7 will be explained. First, the exposure amount control process in case of a backlight scene, in which an imaging of the object is performed against the light source behind the object, will be explained. Then, the exposure amount control process in case of a high-brightness scene, in which no object is in backlight status, will be explained. The high-brightness scene corresponds to a case of imaging, for example, an extremely bright outdoor scenery such as sky, ocean, snowfield and the like on a clear weather.

[The Exposure Amount Control Process of the Backlight Scene]

Figure 2A:
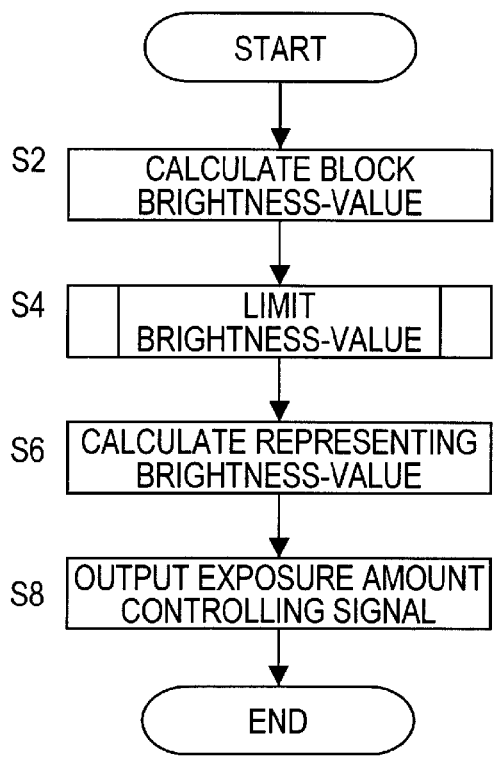
FIGS. 2A and 2B are flow-chart diagrams for illustrating steps of an exposure amount control process.
Figure 2B:
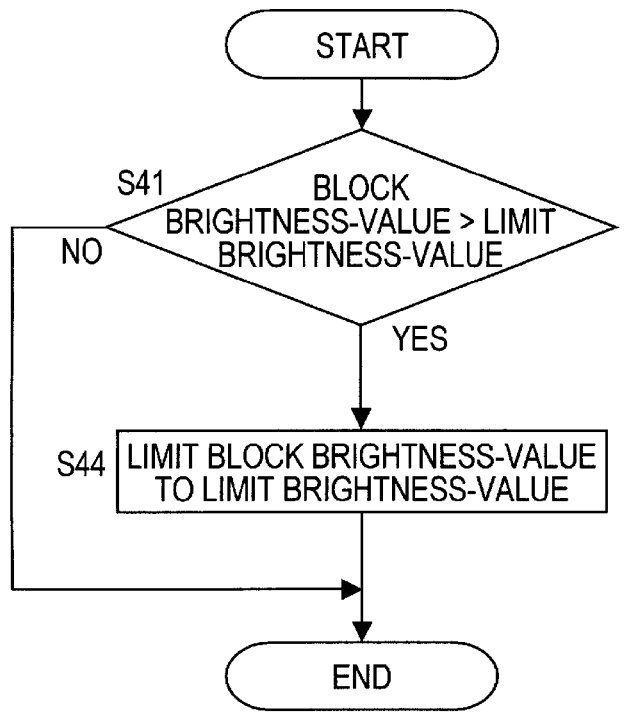

FIGS. 2A and 2B are flowchart diagrams for illustrating example steps of the exposure amount control process. Steps S2 to S8 illustrated in FIG. 2A are executed by the CPU 10, for example, when the brightness-value detecting unit 11 finishes detections of the brightness-value of pixels in one frame. Also, subroutine steps of the step S4 are illustrated in FIG. 2B.

Figure 3A:
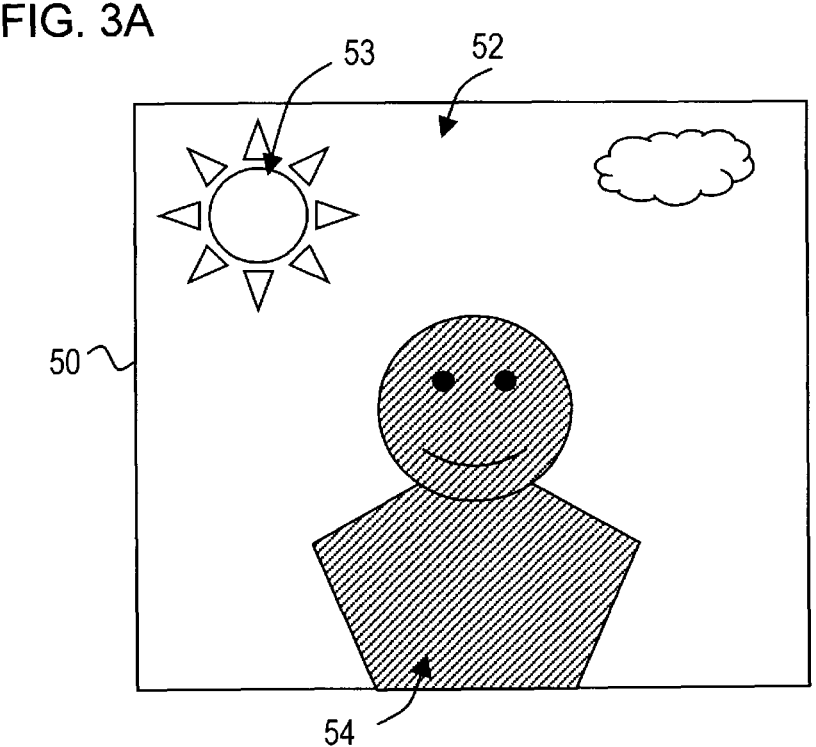
FIGS. 3A and 3B are drawings for illustrating an imaged image data in a backlight scene.
Figure 3B:
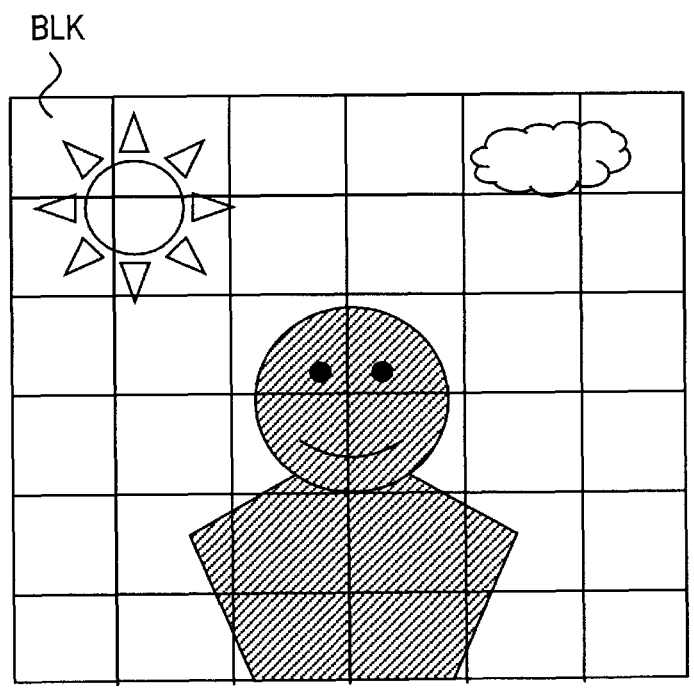

First, at the step S2 of FIG. 2A, the brightness-value calculating unit 30 divides the imaged image data 50 of one frame into a plurality of blocks, and calculates a block brightness-value of each block. In FIG. 3A, a schematic imaged image data 50 in the backlight scene is illustrated. The imaged image data 50 includes a plurality of pixel data arranged in a matrix. This imaged image data 50 includes, for example, a background 52 including a light source 53 and an object 54 in a backlight condition receiving a light from the light source 53. The background 52 has a relatively high brightness, and the object 54 has a relatively low brightness. Such the imaged image data 52 of one frame is divided, as illustrated in FIG. 3B, into a plurality of blocks BLKs arranged in a matrix. That is, the pixel data of the imaged image data 50 are equally divided in a row direction and in a column direction.

The brightness-value calculating unit 30 accumulates, for example, the brightness-value of each pixel in the block BLK. This accumulated value is the block brightness value. Or, the brightness-value calculating unit 30 may calculate the average value of the brightness-value of pixels in the block BLK as the block brightness value. For example, in case that the brightness-value of each pixel is represented within a gradation range from 0 to 1023 by 10 bit resolution, and that the accumulated value is used as the block brightness value, a possible block brightness-value is in a range from 0 to 1023 multiplied by the number of the pixel in the block. Or, in case that the average value is used as the block brightness value, the possible block brightness-value is in a range from 0 to 1023.

Next, at the step S4 of FIG. 2A, the brightness-value limiting unit 32 limits the block brightness-values to a prescribed limit brightness value. For example, the steps illustrated in FIG. 2B are executed for the block brightness-value of the each block BLK. For example, when the block brightness-value is greater than the limit brightness-value (YES at the step S41), the brightness-value limiting unit 32 limits the block brightness-value to the limit brightness-value (S44), and, when the block brightness-value is equal to or less than the limit brightness-value (NO at the step S41), execution of the steps in FIG. 2B is finished.

Figure 4A:
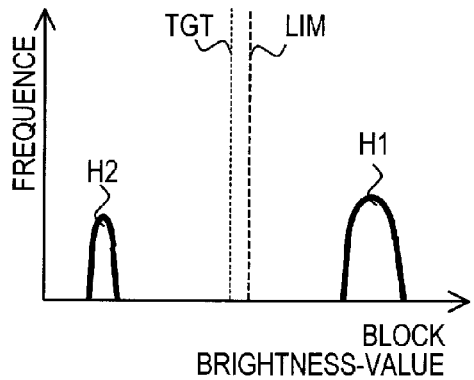
FIGS. 4A-4F are drawings for illustrating a distribution state of a block brightness-value in the backlight scene.

Distribution states at this time of the block brightness-value of the imaged image data 50 are exemplarily illustrated in FIGS. 4A-AF. In FIGS. 4A-4F, the distribution state of the block brightness-values of the imaged image data 50 is schematically illustrated, with the horizontal axis representing the block brightness value, and the vertical axis representing the frequence (degree of frequency).

In FIG. 4A, an example of the imaged image data 50 of the 1st frame is illustrated. As for the imaged image data 50 in the backlight scene, a high-brightness block brightness-value distribution H1 corresponding to the background 52, and the low-brightness block brightness-value distribution H2 corresponding to the object 54 are formed. The limit brightness-value LIM is set at a value, which is greater to some extent than the target brightness-value TGT. For example, in case that the brightness-value of the each pixel is represented in a gradation range from 0 to 1023 by 10 bit resolution, the target brightness-value TGT corresponding to the optimal exposure amount is around 180 in a range from 0 to 1023, for example, at "184". Then, the limit brightness-value LIM is set, for example at "200" and the like, a greater value than the target brightness-value TGT by the amount of a few percent to less than 20 percent.

Figure 4B:
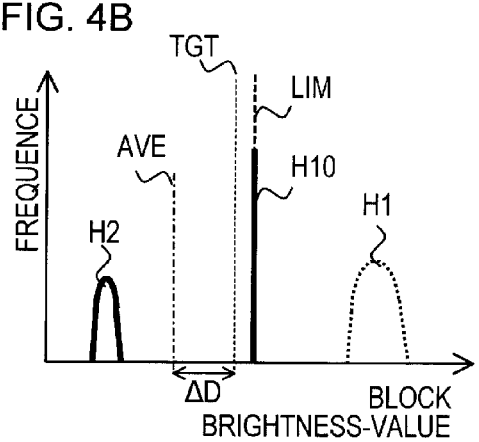

Here, the block brightness-value distribution H1, which is greater than the limit brightness-value LIM, is limited to the limit brightness-value LIM. Then, the distribution of the block brightness-value becomes as illustrated in FIG. 4B. In FIG. 4B, the frequence of the block brightness-value distribution H1 of the high-brightness is accumulated as the frequence of the limit brightness-value LIM, and a block brightness-value distribution H10 of the limit brightness-value LIM is formed.

Next, at the step S6 of FIG. 2A, the representing brightness-value calculating unit 34 calculates the representing brightness-value of the block brightness-value of one frame. The representing brightness-value is, for example, the average value of the block brightness-values of one frame. Or, it may be the median value. Hereinafter, an explanation will be made with the average value of the block brightness-values being the representing brightness value. In an example of FIG. 4B, by limiting the block brightness-value distribution H1 of the high-brightness to the limit brightness-value LIM, an average value AVE of the block brightness-value distribution H10 and the block brightness-value distribution H2 is calculated.

Next, at the step S8, the exposure amount controlling unit 36 generates the exposure amount controlling signal 40 indicating the control amount of the exposure amount so that the average value AVE of the block brightness-value corresponds to the target brightness-value TGT, and outputs it to the imaging unit 4. In an example of FIG. 4B, the average value AVE is less than the target brightness-value TGT by the difference ΔD. Therefore, such the exposure amount controlling signal 40 is generated that the exposure amount corresponding to the difference ΔD is increased. The control amount of the exposure amount corresponding to required increment/decrement of the average value AVE is obtained by the exposure amount controlling unit 36 on the basis of a formula or a map data obtained by an experiment or the like. Such a formula or a map data is/are, for example, previously stored as a part of the processing program in the ROM 12. When imaging is performed according to such the exposure amount controlling signal 40, an image of higher brightness as a whole than that of the 1st frame is imaged at the 2nd frame.

Figure 4C:
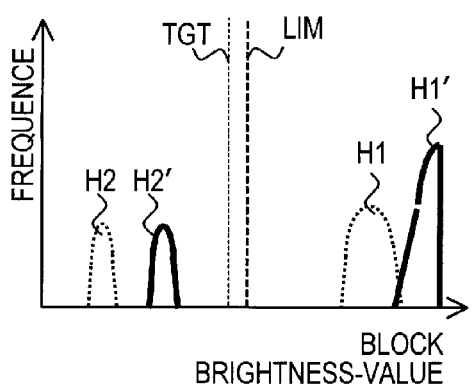

The distribution state of the block brightness-value of the imaged image data 50 of the 2nd frame is as illustrated in FIG. 4C. Block brightness-value distributions H1' and H2' respectively correspond to the block brightness-value distributions H1 and H2 of the 1st frame shifted to the high-brightness side according to the increment of the exposure amount. Further, an example, in which a part of the block brightness-value distribution H1 of the high-brightness is saturated, is illustrated.

Figure 4D:
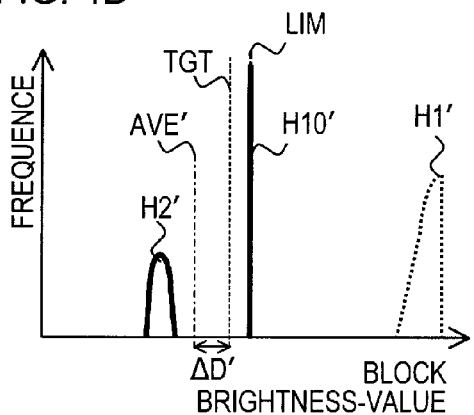

For the 2nd frame, in the same manner as the 1st frame, the steps S2 to S8 in FIG. 2A are executed. For the 2nd frame, at the step S4, the brightness-value limiting unit 32 limits the block brightness-value H1', which is greater than the limit brightness-value LIM, to the limit brightness-value LIM. The state at this time is illustrated in FIG. 4D. By accumulating the frequence of the block brightness-value distribution H1' to the frequence of the limit brightness-value LIM, a block brightness-value distribution H10' of the limit brightness-value LIM is formed. Then, at the step S6, the representing brightness-value calculating unit 34 calculates the average value AVE' of the block brightness-value. Here, the average value AVE' is the average value of the block brightness-value distribution H2' and the block brightness-value distribution H10'.

Then, the exposure amount controlling unit 36 generates such the exposure amount controlling signal 40 that the average value AVE' corresponds to the target brightness-value TGT, that is, the exposure amount corresponding to the difference ΔD' of the average value AVE' and the target brightness-value TGT is increased, and outputs it to the imaging unit 4. Further, at the 2nd frame, the block brightness-value distribution H2' is shifted towards the higher-brightness side than the block brightness-value distribution H2 of the 1st frame. Therefore, the average value AVE' is greater than the average value AVE of the 1st frame. Therefore, the difference ΔD' is decreased from the difference ΔD of the 1st frame. Therefore, by that extent, the increment of the exposure amount decreases. When an imaging according to the exposure amount controlling signal 40 is performed, higher-brightness image, to some extent, than that of the 2nd frame, is imaged at the 3rd frame.

Figure 4E:
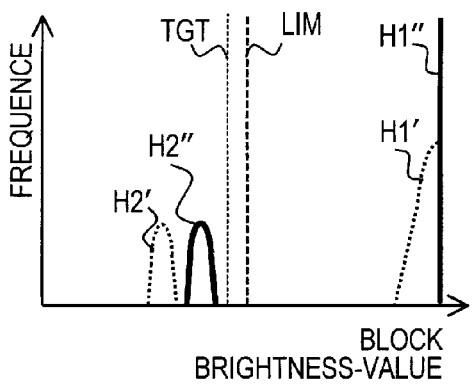

The distribution state of the block brightness-value of the imaged image data 50 of the 3rd frame is as illustrated in FIG. 4E. Block brightness-value distributions H1" and H2" respectively correspond to the block brightness-value distributions H1' and H2' of the 2nd frame, which are shifted to the higher-brightness side according to the increment of the exposure amount. Further, the state that the entire high-brightness block brightness-value distribution H1" is saturated is illustrated.

Figure 4F:
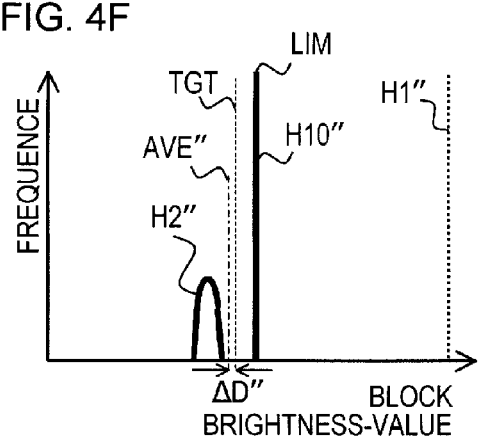

At the 3rd frame, as in the similar manner as the 1st and the 2nd frames, the steps S2 to S8 in FIG. 2A are executed. At the 3rd frame, at the step S4, the brightness-value limiting unit 32 limits the block brightness-value H1", which is greater than the limit brightness-value LIM, to the limit brightness-value LIM. The state at this time is illustrated in FIG. 4F. By the frequence of the block brightness-value distribution H1" being accumulated to the frequence of the limit brightness-value LIM, a block brightness-value distribution H10" of the limit brightness-value LIM is formed. Then, at the step S6, the representing brightness-value calculating unit 34 calculates the average value AVE" of the block brightness-value. Here, the average value AVE" is the average value of the block brightness-value distribution H2" and the block brightness-value distribution H10".

Then, the exposure amount controlling unit 36 generates the exposure amount controlling signal 40 such that the average value AVE" corresponds to the target brightness-value TGT, that is, the exposure amount corresponding to the difference ΔD" between the average value AVE" and the target brightness-value TGT is increased, and outputs it to the imaging unit 4. Further, at the 3rd frame, the block brightness-value distribution H2" is shifted towards the higher-brightness side than the block brightness-value distribution H2' of the 2nd frame. Therefore, the average value AVE" is greater than the average value AVE' of the 2nd frame. Therefore, the difference ΔD" is decreased from the difference ΔD' of the 2nd frame. Therefore, the increment of the exposure amount decreases. Then, when the imaging is performed at the next frame according to such the exposure amount controlling signal, an image of higher-brightness to some degree is imaged according to the exposure amount controlling signal 40.

By executing the above exposure amount control process in each frame, the difference from the average value and the target brightness-value TGT of the block brightness-value is gradually decreased. Then, according to this, the control amount of the exposure amount is gradually decreased. Then, conclusively, the exposure amount for the object converges with the optimal exposure amount. Therefore, in case of the backlight scene, such the imaged image data 50 is generated that the object 54 has the target brightness-value TGT.

[The Exposure Amount Control Process in Case of High-brightness Scene]

Then, the exposure amount control process in case of high-brightness scene will be explained. Here, according to the flow-chart in FIG. 2A, FIGS. 5A and 5B and FIGS. 6A-6H will be occasionally refereed to.

Figure 5A:
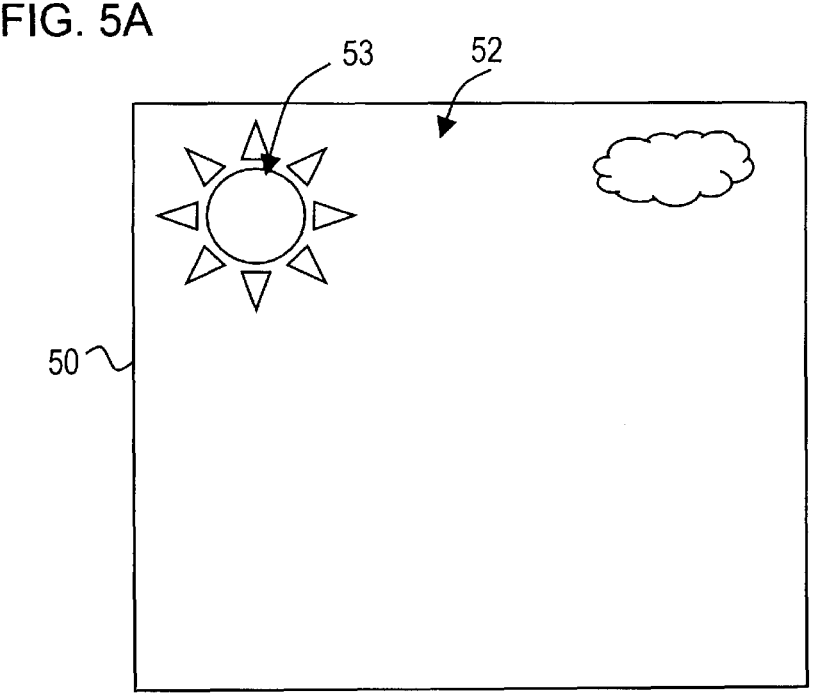
FIGS. 5A and 5B are drawings for illustrating an imaged image data in a high-brightness scene.
Figure 5B:
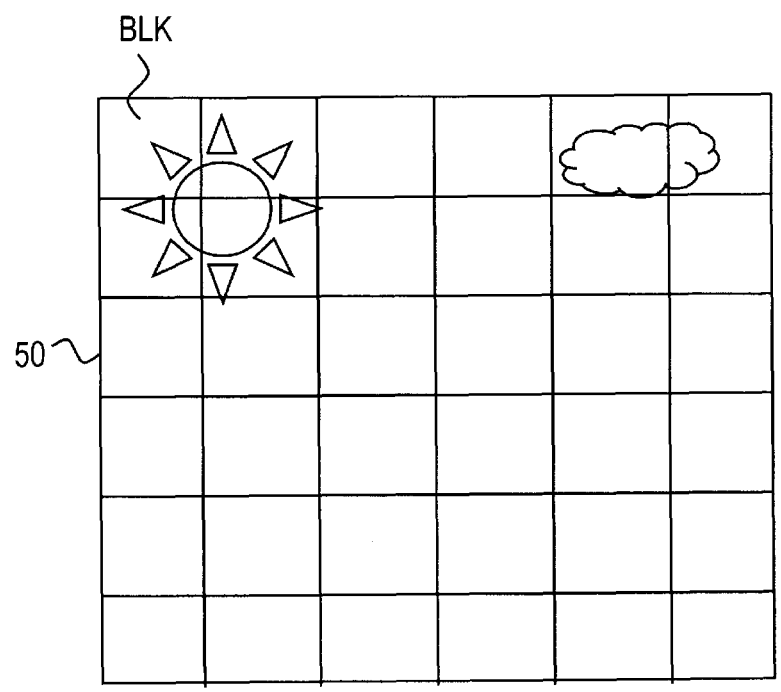

First, at the step S2 of FIG. 2A, the brightness-value calculating unit 30 divides the imaged image data of one frame into a plurality of blocks, and accumulates the brightness value of each block to calculate the block brightness-value of the each block. In FIG. 5A, a schematic imaged image data 50 in a high-brightness scene is illustrated. This imaged image data 50 has the background 52 including the light source 53. On the other hand, the imaged image data 50 does not have an object in backlight state by receiving a light from the light source 53. Therefore, the background 52 entirely has a high-brightness. In this case, the high-brightness corresponds to, for example, a range which is greater than the target brightness-value in the dynamic range of the brightness value. Also, a state that such the imaged image data 50 of one frame is divided into a plurality of blocks BLKs arranged in a matrix is exemplarily illustrated in FIG. 5B.

Next, at the step S4 of FIG. 2A, the brightness-value limiting unit 32 limits, the block brightness-value which is greater than the limit brightness-value LIM to the limit brightness-value LIM. The distribution state at this time of the block brightness-value of the imaged image data 50 is exemplarily illustrated in FIGS. 6A-6H.

Figure 6A:
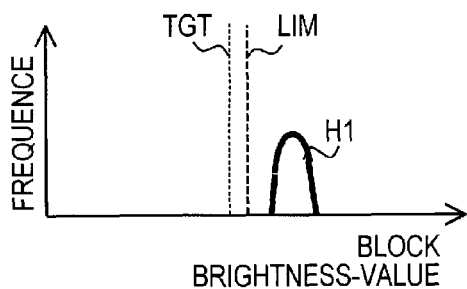
FIGS. 6A-6H are drawings for illustrating the distribution state of the block brightness-value in the high-brightness scene.
Figure 6B:
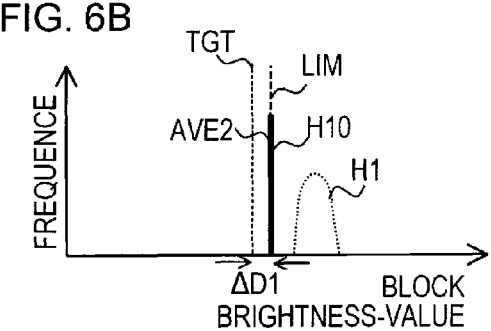

In FIGS. 6A-6H, the horizontal axis representing the block brightness-value and the vertical axis representing frequence (degree of frequence), schematic distribution states of the block brightness-value of the imaged image data 50 is illustrated. In FIG. 6A, an example of the imaged image data 50 of the 1st frame is illustrated. At the imaged image data 50 in the high-brightness scene, a block brightness-value distribution H1 of the high-brightness corresponding to the background 52 is formed. Then, the block brightness-value H1, which is greater than the limit brightness-value LIM, is limited to the limit brightness-value LIM. Then, distributions of the block brightness-value is as illustrated in FIG. 6B. In FIG. 6B, the frequence of the block brightness-value distribution H1 of the high-brightness is accumulated as the frequence of the limit brightness-value LIM. Therefore, a block brightness-value distribution H10 of the limit brightness-value LIM is formed.

Next, at the step S6 of FIG. 2A, the representing brightness-value calculating unit 34 calculates the average value of the block brightness-values of one frame. In an example in FIG. 6B, by limiting the block brightness-value distribution H1 of the high-brightness to the limit brightness-value LIM, the average value AVE2 coinciding with the limit brightness-value LIM is calculated.

Next, at the step S8 of FIG. 2A, the exposure amount controlling unit 36 generates the exposure amount controlling signal 40 indicating the control amount of the exposure amount such that the average value AVE2 of the block brightness-value corresponds to the target brightness-value TGT, and outputs it to the imaging unit 4. In an example of FIG. 6B, the average value AVE2 is greater than the target brightness-value TGT by the difference ΔD1. Therefore, the exposure amount controlling signal 40 for decreasing the exposure amount corresponding to the difference ΔD1 is generated. When an imaging according to such the exposure amount controlling signal 40 is performed, an image which has a lower-brightness to some extent as a whole than that of the 1st frame is imaged at the 2nd frame.

Figure 6C:
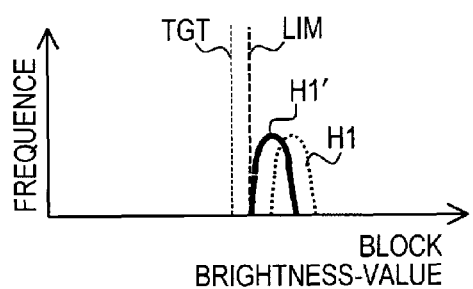

A distribution state of the block brightness-value of the imaged image data 50 of the 2nd frame is as illustrated in FIG. 6C. The block brightness-value distribution H1' corresponds to the block brightness-value distribution H1 of the 1st frame shifted to the low-brightness side according to decrement of the exposure amount.

Figure 6D:
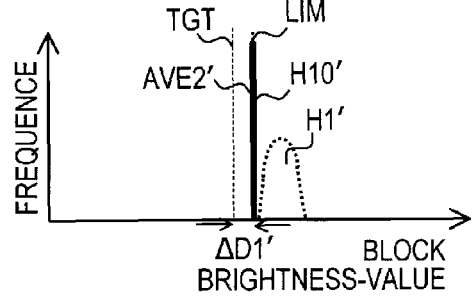

At the 2nd frame, as in the similar manner to the 1st frame, the steps S2 to S8 of FIG. 2A are executed. At the 2nd frame, at the step S4, the brightness-value limiting unit 32 limits a block brightness-value H1' which is greater than the limit brightness-value LIM to the limit brightness-value LIM. The state at this time is illustrated in FIG. 6D. By the frequence of the block brightness-value distribution H1' being accumulated to the frequence of the limit brightness-value LIM, a block brightness-value distribution H10' of the limit brightness-value LIM is formed. Then, at the step S6, the representing brightness-value calculating unit 34 calculates the average value AVE2' of the block brightness-value. By limiting the block brightness-value H1' to the limit brightness-value LIM, the average value AVE2' coinciding with the limit brightness-value LIM is calculated.

Then, the exposure amount controlling unit 36 generates the exposure amount controlling signal 40 such that the average value AVE2' corresponds to the target brightness-value TGT, that is, the exposure amount is decreased, and outputs it to the imaging unit 4. Further, at the 2nd frame, the block brightness-value distribution H1' is shifted to the lower-brightness side than the block brightness-value distribution H1 of the 1st frame, but still is greater than the limit brightness-value LIM, and thus being limited to the limit brightness-value LIM as in the similar manner to the 1st frame. Therefore, the average value AVE2' corresponds to the same value as the average value AVE2 of the 1st frame, that is, the limit brightness-value LIM. Therefore, the difference $\Delta D1'$ between the average value AVE2' and the target brightness-value TGT is equivalent to the difference $\Delta D1$ of the 1st frame. Therefore, the decrement of the exposure amount corresponding to the difference $\Delta D1'$ is equivalent to the decrement of the exposure amount corresponding to the difference $\Delta D1$. Then, when an imaging is performed according to such the exposure amount controlling signal 40, a lower-brightness image as a whole to some extent than the 2nd frame is imaged at the 3rd frame.

Figure 6E:
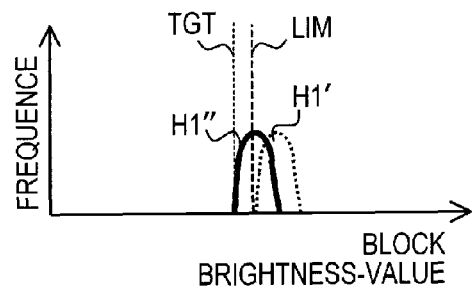

A distribution state of the block brightness-value of the imaged image data 50 of the 3rd frame is as illustrated in FIG. 6E. A block brightness-value distribution H1" corresponds to the block brightness-value distribution H1' of the 2nd frame shifted to low-brightness side according to the decrement of the exposure amount.

Figure 6F:
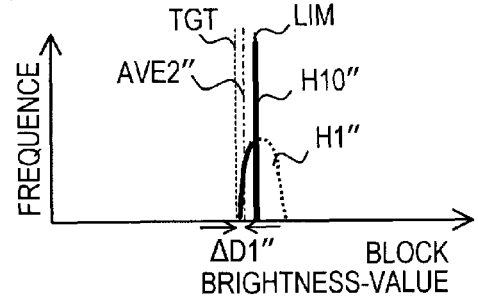

At the 3rd frame, as in the similar manner to the 1st and the 2nd frames, the steps S2 to S8 of FIG. 2A are executed. At the 3rd frame, at the step S4, the brightness-value limiting unit 32 limits to the limit brightness-value LIM a part of the block brightness-value H1" which is greater than the limit brightness-value LIM. The state at this time is illustrated in FIG. 6F. By the frequence of the part of the block brightness-value distribution H1" which is greater than the limit brightness-value LIM being accumulated to the frequence of the limit brightness-value LIM, a block brightness-value distribution H10" of the limit brightness-value LIM is formed. Then, at the step S6, the representing brightness-value calculating unit 34 calculates the average value AVE2" of the block brightness-value. The average value AVE2" corresponds to the average value of a part of the block brightness-value distribution H1", which is less than the limit brightness-value LIM, and the block brightness-value distribution H10".

Then, the exposure amount controlling unit 36 generates the exposure amount controlling signal 40 such that the average value AVE2" corresponds to the target brightness-value TGT, that is, the exposure amount is increased, and outputs it to the imaging unit 4. At the 3rd frame, since a part of the block brightness-value distribution H1", which is less than the limit brightness-value LIM, is formed, the average value AVE2" becomes less than the average value AVE2' of the 2nd frame. Therefore, the difference $\Delta D1"$ between the average value AVE2" and the target brightness-value TGT is decreased from the difference $\Delta D1'$ of the 2nd frame. Therefore, decrement of the exposure amount is decreased. Then, when an imaging is performed according to such the exposure amount-controlling signal 40, a lower-brightness image to some extent as whole than the 3rd frame is imaged at the 4th frame.

Figure 6G:
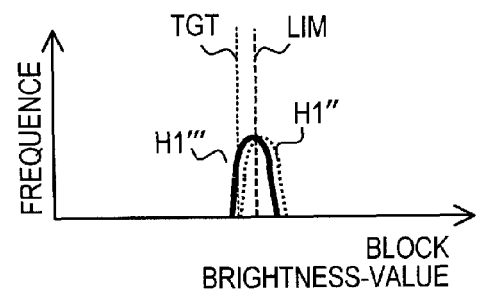

The distribution state of the block brightness-value of the imaged image data 50 of the 4th frame is as illustrated in FIG. 6G. A block brightness-value distribution H1''' corresponds to the block brightness-value distribution H1" of the 3rd frame shifted to the low-brightness side according to decrement of the exposure amount.

Figure 6H:
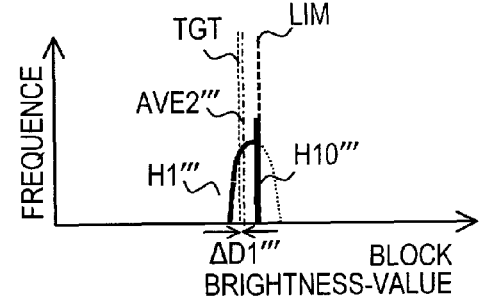

At the 4th frame, as in the similar manner to the 1st frame to the 3rd frame, the steps S2 to S8 of FIG. 2A are executed. At the 4th frame, at the step S4, the brightness-value limiting unit 32 limits a part of the block brightness-value H1''', which is greater than the limit brightness-value LIM, to the limit brightness-value LIM. The state at this time is illustrated in FIG. 6H. By the frequence of a part of the block brightness-value distribution H1''', which is greater than the limit brightness-value LIM, being accumulated to the frequence of the limit brightness-value LIM, a block brightness-value distribution H10''' of the limit brightness-value LIM is formed. Then, at the step S6, the representing brightness-value calculating unit 34 calculates the average value AVE2''' of the block brightness-value. The average value AVE2''' corresponds to the average value of a part of the block brightness-value distribution H1''' less than the limit brightness-value LIM and the block brightness-value distribution H10'''. Then, the exposure amount controlling unit 36 generates the exposure amount controlling signal 40 such that the average value AVE2''' corresponds to the target brightness-value TGT, that is, the exposure amount is decreased, and outputs it to imaging unit 4. At the 4th frame, a part of the block brightness-value distribution H1''', which is less than the limit brightness-value LIM, is formed, and the part is greater than the 3rd frame. Therefore, the average value AVE2''' is less than the average value AVE2" of the 3rd frame. Therefore, the difference $\Delta D'''$ between the average value AVE2''' and the target brightness-value TGT is decreased from the difference $\Delta D1"$ of the 3rd frame. Therefore, decrement of the exposure amount becomes smaller thereby. Then, when an imaging is performed according to such the exposure amount controlling signal 40, a lower-brightness image to some extent as a whole is imaged at the next frame.

By the above exposure amount control process at each frame being performed, the difference between the average value of the block brightness-values and the target brightness-value TGT is gradually decreased, and, according to this, the control amount of the exposure amount is gradually decreased. Then, conclusively, the exposure amount for the background converges with the optimal exposure amount. Therefore, in case of the high-brightness scene, such the imaged image data 50 is generated that the background 52 has the target brightness-value TGT.

As above described, according to the present embodiment, in case of the backlight scene, an imaging is performed with the optimal exposure amount for the object, and thereby, a preferable imaged image is obtained. Adding to this, in case of the high-brightness scene, an imaging is performed with the optimal exposure amount for the background, and a preferable imaged image is obtained.

[Variation Embodiment]

Next, one of variation embodiments will be explained. Hereafter, above described exposure amount control process is referred to, for convenience sake, as a normal exposure amount control process, to be distinguished from that of the following variation embodiment. In this variation embodiment, when the minimum value of the block brightness-value is greater than a first limit brightness-value, which is the limit brightness-value LIM, the brightness-value limiting unit 32 limits the block brightness-value not to the limit brightness-value LIM, but to a second limit brightness-value which is greater than the limit brightness-value LIM. Such the second limit brightness-value is, for example, an arbitrary value which is greater than the limit brightness-value LIM, and is equal to or less than the minimum value of the block brightness-value. In the explanation below, the minimum value of the block brightness-value is explained as the second limit brightness-value. This variation embodiment is performed, for example, in case of a high-brightness scene, in which the minimum value of the block brightness-value is greater than the limit brightness-value LIM.

Figure 7A:
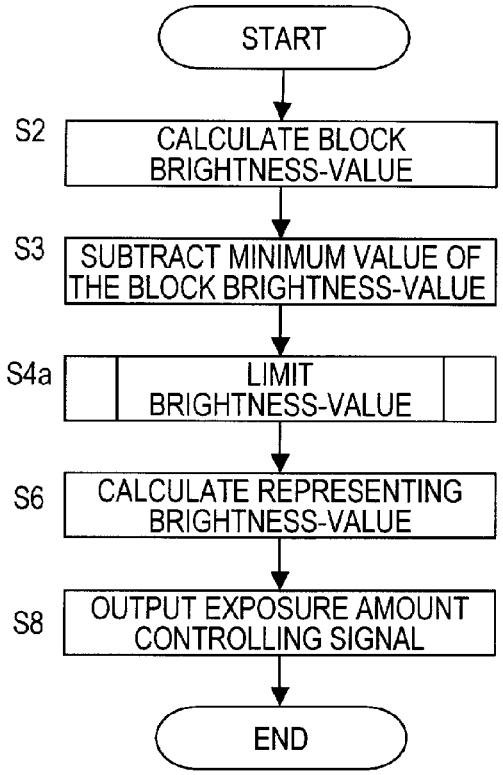
FIGS. 7A and 7B are flow-chart diagrams for illustrating steps of the exposure amount control process.
Figure 7B:
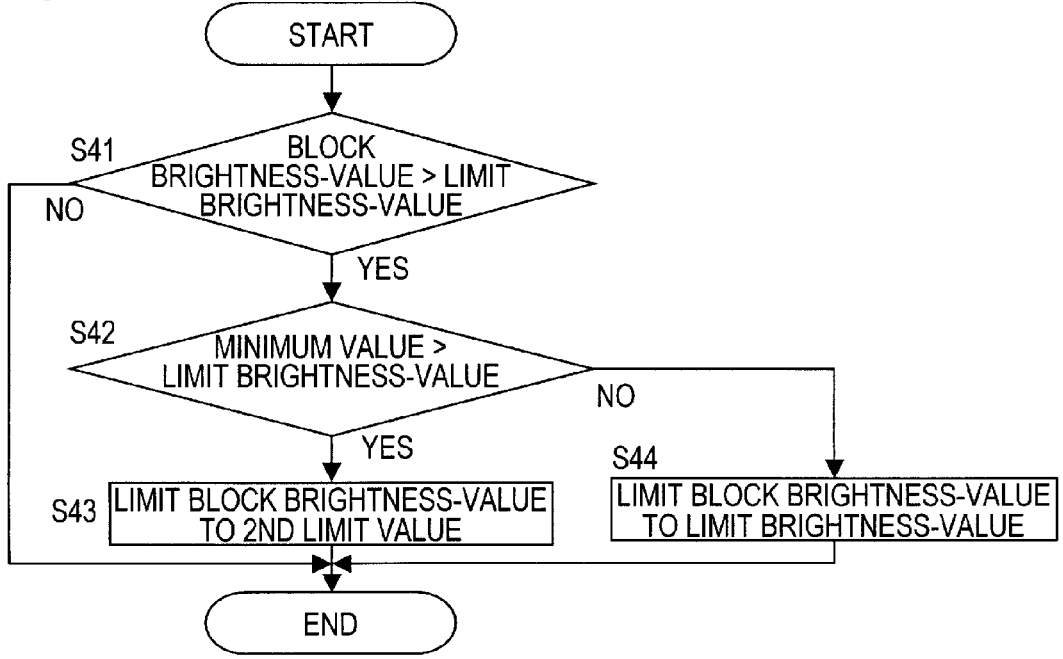

FIGS. 7A and 7B are flow-chart diagrams for illustrating steps of the exposure amount control process of the variation embodiment. The example steps in FIG. 7A correspond to the steps of FIG. 2A, with a step S3 inserted after the step S2, and with the step S4 being replaced with a step S4a. Also, in FIG. 7B, subroutine steps corresponding to the step S4a are illustrated. The steps in FIG. 7B correspond to the step in FIG. 2B with the additional step S42, and S43.

The steps S2 to S8 illustrated in FIG. 7A are executed by CPU 10 at each frame, for example, in the similar manner to the steps in FIG. 2A, when the brightness-value detecting unit 11 finishes the detection of the brightness value of one frame. First, at the step S2, the brightness-value calculating unit 30 divides the imaged image data of one frame into a plurality of blocks, and, by accumulating the brightness value of the each block, calculates the block brightness-value of the each block. Next, at the step S3, the brightness-value limiting unit 32 subtracts, the minimum value of the block brightness-value of one frame.

Figure 8A:
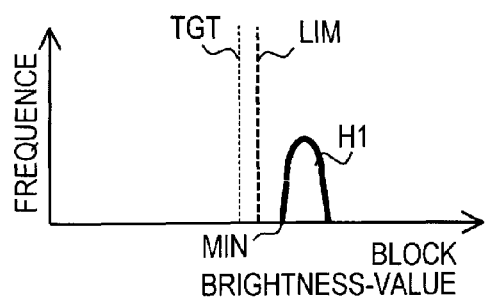
FIGS. 8A-8D are drawings for illustrating the distribution state of the block brightness value.

Here, the distribution state of the block brightness-value of the imaged image data 50 in the high-brightness scene illustrated in FIG. 5, is exemplarily illustrated in FIGS. 8A-8D. In FIG. 8A-8D, the horizontal axis representing the block brightness-value, and the vertical axis representing frequence (degree of frequence), distribution example of the block brightness-value of the imaged image data 50 is schematically illustrated. In FIG. 8A, an example of the imaged image data 50 of the 1st frame is illustrated. In the imaged image data 50 of the high-brightness scene, a block brightness-value distribution H1 of the high-brightness corresponding to the background 52 is formed. Then, the minimum value MIN of the block brightness-value distribution H1 is subtracted. Here, the minimum value MIN is greater than the limit brightness-value LIM.

Figure 8B:
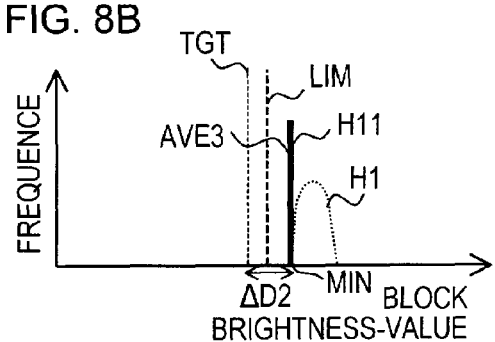

At the step S4a in FIG. 7A, the brightness-value limiting unit 32 limits the block brightness-value. At this time, the steps in FIG. 7B are executed for the each block brightness-value. In case that the block brightness-value is greater than the limit brightness-value LIM (YES at the step S41), the brightness-value limiting unit 30 proceeds to the step S42. Then, in case that the minimum value MIN of the block brightness-value is equal to or less than the limit brightness-value LIM (NO at the step S42), the brightness-value limiting unit 32 limits the block brightness-value to the limit brightness-value LIM (the step S44). That is, a normal exposure amount control process is executed. On the other hand, in case that the minimum value MIN of the block brightness-value is greater than the limit brightness-value LIM (YES at the step S42), the block brightness-value is limited to a second limit brightness-value, for example, the minimum value MIN (the step S43). The state at this time is illustrated in FIG. 8B. In FIG. 8B, by the frequence of the block brightness-value distribution H1 being accumulated to the frequence of the minimum value MIN, a block brightness-value distribution H11 is formed.

Next, at the step S6 of FIG. 7A, the representing brightness-value calculating unit 34 calculates the average value of the block brightness-values of one frame. In an example in FIG. 8B, by the block brightness-value distribution H1 of the high-brightness being limited to the minimum value MIN, the average value AVE3 coinciding with the minimum value MIN is calculated.

Next, at the step S8, the exposure amount controlling unit 36 generates the exposure amount controlling signal 40 indicating the control amount of the exposure amount such that the average value AVE3 of the block brightness-values corresponds to the target brightness-value, and outputs it to the imaging unit 4. In an example of FIG. 8B, since the average value AVE3 is greater than the target brightness-value TGT by the difference $\Delta D2$, the exposure amount controlling signal 40 for decreasing the exposure amount by the amount corresponding to the difference $\Delta D2$ is generated. Here, as illustrated in FIG. 6B, in comparison to a case that the block brightness distribution H1 is limited to the limit brightness-value LIM, the difference $\Delta D2$ between the average value AVE3 and the target brightness-value TGT is greater than the difference $\Delta D1$ between the average value AVE and the target brightness-value TGT. Therefore, the control amount of the exposure amount according to the variation embodiment is greater than the control amount of the exposure amount according to the normal exposure amount control process. When an imaging is performed according to such the exposure amount controlling signal 40, a lower-brightness image to a large degree as a whole than that of the 1st frame is imaged at the 2nd frame.

Figure 8C:
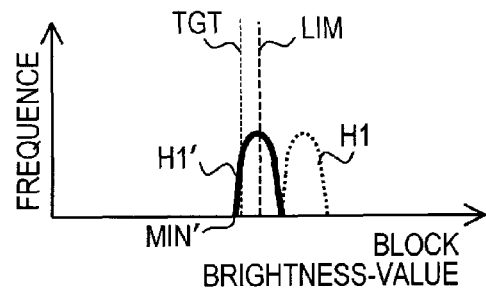

The distribution state of the block brightness-value of the imaged image data 50 of the 2nd frame is as illustrated in FIG. 8C. The block brightness-value distribution H1' corresponds to the block brightness-value distribution H1 of the 1st frame, which is shifted to the low-brightness side according to the decrement of the exposure amount. Thereby, the minimum value MIN' of the block brightness-value distribution H1' is less than the limit brightness-value LIM. Therefore, at the 2nd frame, when the steps S2 to S8 of FIG. 7A are executed, the result at the step S42 in FIG. 7B is "NO". Therefore, in the process thereafter, such a processes equivalent to the normal exposure amount control process in the high-brightness scene, as illustrated in FIGS. 2A and 2B, and FIGS. 6A and 6B, is executed.

According to this variation embodiment, at the exposure amount control process for the high-brightness scene, when the minimum value of the block brightness-value is greater than the limit brightness-value LIM, by the block brightness-value being limited to a second limit brightness-value greater than the limit brightness-value LIM, that is, the minimum value MIN, the exposure amount is decreased by the control amount which is greater than that of the normal exposure amount control process. Therefore, it is enabled to converge the exposure amount for the background with the optimal exposure amount, more promptly than the normal exposure amount control process.

Figure 8D:
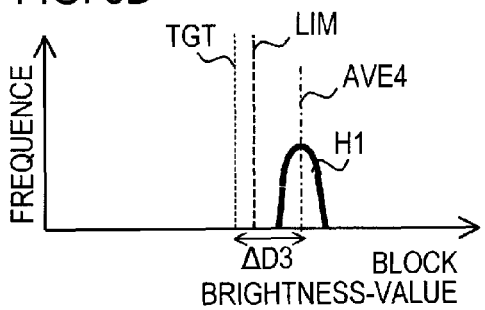

Further, in another variation embodiment, the brightness-value limiting unit 36 may simply avoid limiting the block brightness-value to the limit brightness-value LIM, when the minimum value MIN of the block brightness-value is greater than the limit brightness-value LIM. For example, the step S43 in FIG. 7B may be omitted. In that case, the representing brightness-value calculating unit 34 calculates, as illustrated in FIG. 8D, the average value AVE4 of the block brightness-value distribution H1 as the representing brightness-value. In this case, the difference ΔD3 between the target brightness-value TGT and the average value AVE4 is greater than the difference ΔD2 in case of the block brightness-value being limited to the minimum value MIN. Therefore, the exposure amount controlling unit 36 generates the exposure amount controlling signal 40 for decreasing the exposure amount by the control amount which is greater than that of the case of the block brightness-value being limited to the minimum value MIN. Thereby, it is enabled to converge the exposure amount for the background with the optimal exposure amount more rapidly than the exposure amount control process of the above variation embodiment.

Next, another exemplary embodiment is illustrated by using an example of the block brightness-value.

[Exemplary Embodiment in the Backlight Scene]

FIGS. 9A-9I are diagrams for illustrating an exemplary embodiment in case of the backlight scene. FIG. 9A illustrates the imaged image data on starting the process. As illustrated in FIG. 9A, in the imaged image data 50, the background 52 has a relatively high-brightness, and, contrary to this, the object 54 has a relatively low-brightness. Further, hereafter, in FIGS. 9A-9I, the low brightness of the object 54 is described by a thickness of hatching.

FIG. 9B illustrates the block brightness-values of the imaged image data 50 in FIG. 9A. Each cell represents a block, and each number therein represents the block brightness-value. In an explanation of the exemplary embodiment hereafter, for convenience sake, an example of 16 blocks in one frame is illustrated. Also, the block brightness-values are illustrated in a gradation scale from 0 to 1023. Then, the target brightness-value is assumed as "185". Then, blocks surrounded by double lines correspond to the object 54, and the other blocks correspond to the background 52. In blocks corresponding to the background 52, the block brightness-values are as high as "150" or "500", but, contrary to this, in blocks corresponding to the object 54, the block brightness-values are as low as "10". Also, at this time, the average value of the entire block brightness-values is a value of "185" coinciding with the target brightness-value. This indicates that, an image is imaged, as a whole, with the exposure amount suitable for the background 52.

FIG. 9C illustrates the state that the block brightness-values in FIG. 9B are limited, as the limit brightness-value being "200". Among blocks corresponding to the background 52, in blocks having the block brightness-values of "500", since the block brightness-values of "500" are greater than the limit brightness-value "200", the block brightness-values are limited to "200". As a result, the average value of the block brightness-values is "110". This average value is less than the target brightness-value "185" by "75". Therefore, by increasing the exposure amount corresponding to the difference, an imaging is performed.

FIG. 9D illustrates the imaged image data 50 imaged when the exposure amount is increased. As illustrated in FIG. 9D, in the imaged image data 50, hatching of the object 54 is lighter than that of the imaged image data 50 in FIG. 9A, which indicates that the brightness of the object 54 becomes high to some extent.

FIG. 9E illustrates block brightness-values of the imaged image data 50 in FIG. 9D. In comparison to FIG. 9B, by increment of the exposure amount, in blocks corresponding to the background 52, the block brightness-values increase to "300" or "1000". On the other hand, in blocks corresponding to the object 54, the block brightness-values increase to "20".

Also, at this time, the average value of the entire block brightness-values is "370", which is increased from the average value "185" at the time of FIG. 9B.

FIG. 9F illustrates the state that the block brightness-values in FIG. 9E are limited. In blocks corresponding to the background 52, which have block brightness-values "1000" and "300", since the block brightness-values are greater than the limit brightness-value "200", the block brightness-values are limited to "200". As a result, the average value of the block brightness-values is "132.5". This average value is still less than the target brightness-value "185" by "52.5", but is increased from the average value "110" at the time of FIG. 9C, which indicates converging with the target brightness-value "185". In next frame, an imaging is performed by increasing the exposure amount by the amount corresponding to the difference "52.5".

FIG. 9G illustrates the imaged image data 50 imaged when the exposure amount for the object 54 converges with the optimal exposure amount. As illustrated in FIG. 9G, at the imaged image data 50, the hatching of the object 54 is lighter than that of the imaged image data 50 in FIG. 9D, which indicates that the brightness of the object 54 becomes high to some extent.

FIG. 9H illustrates the block brightness-values of the imaged image data 50 in FIG. 9G. In comparison to FIG. 9E, by increment of the exposure amount, in blocks corresponding to the background 52, the block brightness-values increase to "1023" (saturated state), and in blocks corresponding to the object 54, the block brightness-values increase to "160". Also, at this time, the average value of the entire block brightness-values is "699.4", which illustrates further increment from the average value "370" in FIG. 9E.

FIG. 9I illustrates the state that the block brightness-values in FIG. 9H are limited. In blocks corresponding to the background 52 of the block brightness-values of "1023", since the block brightness-values of "1023" are greater than the limit brightness-value "200", the block brightness-values are limited to "200". As a result, the average value of the block brightness-values is "185", thus coinciding with the target brightness-value. By repeating such the exposure amount control process, the exposure amount for the object 54 converges with the optimal exposure amount.

[Exemplary Embodiment of the High-Brightness Scene According to Normal Exposure Amount Control Process]

FIGS. 10A-10D are drawings for illustrating an exemplary embodiment of the high-brightness scene according to the normal exposure amount control process. Each cell represents a block and each number therein represents the block brightness-value. In FIGS. 10A-10D, in example of 16 blocks, the block brightness-values are illustrated in gradation range from 0 to 1023. FIG. 10A illustrates the block brightness-values of the imaged image data at the starting of the process. In the high-brightness scene, the block brightness-values as a whole indicate as high value as "750" or "800". At this time, the average value of the entire block brightness-values is "793.8".

FIG. 10B illustrates the state that the block brightness-values in FIG. 10A are limited, for the limit brightness-value being "200". In all blocks having the block brightness-values "750" or "800", since the block brightness-values are greater than the limit brightness-value "200", the block brightness-values are limited to "200". As a result, the average value of the block brightness-values is "200". This average value is greater than the target brightness-value "185" by "15". Therefore, by decreasing the exposure amount by the amount corresponding to the difference, an imaging is performed.

FIG. 10C illustrates the block brightness-value of the image data imaged by decreasing the exposure amount. In comparison to FIG. 10A, by the decrement of the exposure amount, the block brightness-values are decreased to "650" or "700". At this time, the average value of the entire block brightness-values is "693.8", which is decreased from the average value "793.8" at the time of FIG. 10A.

FIG. 10D illustrates the state that the block brightness-value of FIG. 10C is limited. In all blocks having the block brightness-value "650" or "700", since the block brightness-values are greater than the limit brightness-value "200", the block brightness-values are limited to "200". As a result, the average value of the block brightness-values is "200". Since this average value is greater than the target brightness-value "185" by "15", by decreasing the exposure amount by the amount corresponding to the difference, an imaging is performed. This average value is equal to the average value "200" at the time of FIG. 10B. Therefore, in next frame, by decreasing the exposure amount by the amount corresponding to the difference "15", an imaging is performed.

[Embodiment in the High-brightness Scene According to the Variation Embodiment]

FIGS. 11A-11D are drawings for illustrating an embodiment of the exposure amount control process in the high-brightness scene according to the variation embodiment. Each cell represents the block, and the numbers therein represents the brightness value. FIG. 11A illustrates the block brightness-values of the imaged image data at the starting of the process. FIG. 11A is equivalent to FIG. 10A.

FIG. 11B illustrates an example of the block brightness-values of FIG. 11A in a state that, when the minimum value of the block brightness-values is greater than the limit brightness-value "200", the block brightness-values are limited to the minimum value. Since the minimum value "750" of the block brightness-values is greater than the limit brightness-value "200", in all blocks having the block brightness-value "750" or "800", the block brightness-values are limited to the minimum value "750". As a result, the average value of the block brightness-values is "750". This average value is greater than the target brightness-value "185" by "565". Therefore, by decreasing the exposure amount by the amount corresponding to this difference, an imaging is performed. Here, it is illustrated that, by limiting the block brightness-values to the minimum value, the decrement of the exposure amount is greater than the decrement of the exposure amount of the normal exposure amount control process in accordance with the exemplary embodiment as illustrated in FIG. 10B.

FIG. 11C illustrates the block brightness-values of the image data imaged by decreasing the exposure amount. In comparison to FIG. 11A, by the decrement of the exposure amount, the block brightness-values are decreased to "350" or "400". At this time, the average value of the entire block brightness-values is "393.8", which is decreased from the average value "793.8" at the time of FIG. 11A.

FIG. 11D illustrates the state that the block brightness-values of FIG. 11C are limited. Since the minimum value "350" of the block brightness-values is greater than the limit brightness-value "200", in all the blocks having the block brightness-value "350" or "400", the block brightness-values are limited to the minimum value "350". As a result, the average value of the block brightness-values is "350". This average value is greater than the target brightness-value "185" by "165", and, by decreasing the exposure amount by the amount corresponding to this difference, an imaging is performed. Here, it is illustrated that, by limiting the block brightness-values to the minimum value, the decrement of the exposure amount is greater than the decrement of the expo-sure amount of the normal exposure amount control process in the exemplary embodiment as illustrated in FIG. 10D.

Thereby, in the exposure amount control process according to the variation embodiment, in case of the high-brightness scene, when the minimum value of the block brightness-value is greater than the limit brightness-value, the exposure amount is controlled by the control amount greater than that of the normal exposure amount control process. Therefore, more rapid convergence with the optimal exposure amount is enabled.

In the above explanation, examples are described in which the exposure amount for the object converges with the optimal exposure amount in a series of frames (for example, 3 to 4 frames). However, the number of the frames taken for the convergence of the exposure amount is exemplarily described in each case, and an arbitrary number of frames may be taken.

As the above, according to the embodiments, the imaged image data having the optimal brightness is rapidly generated without such complex processes as detecting the position of the object, increasing the brightness value thereof, combining a plurality of the image data imaged by different exposure amounts, and the like. Therefore, the imaging control unit may be configured in a simpler configuration.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of the superiority and inferiority of the embodiments. Although the embodiments have been described in detail, it should be understood that the various changes, substitutions, and alterations could be made hereto without departing from the spirit and scope of the invention.

What is claimed is:

1. An apparatus comprising:
   at least one memory storing instructions; and
   at least one processor executing the instructions to provide:
      a calculator configured to obtain block brightness-values of a plurality of blocks from pixel values of a plurality of pixels that is included in image data of a frame having the plurality of pixels, the frame being divided into the plurality of blocks;
      a limiter configured to substitute, for a first limit brightness-value, a block brightness-value which is more than the first limit brightness-value among the plurality of block brightness-values; and
      a controller configured to control an exposure amount of an imaging device as a basis of a representing brightness-value of the plurality of the block brightness-values and a target brightness-value which is less than the first limit brightness-value,
      wherein the limiter does not substitute, when the minimum value of the plurality of the block brightness-values is larger than the first limit brightness-value, the plurality of the block brightness-values for the first limit brightness-value.

2. An apparatus comprising:
   at least one memory storing instructions; and
   at least one processor executing the instructions to provide:
      a calculator configured to obtain block brightness-values of a plurality of blocks from pixel values of a plurality of pixels that is included in imaged data of a frame having the plurality of pixels, the frame being divided into the plurality of blocks;

a limiter configured to substitute, for a first limit brightness-value, a block brightness-value which is more than the first limit brightness-value among the plurality of block brightness-values; and
a controller configured to control an exposure amount of an imaging device as a basis of a representing brightness-value of the plurality of the block brightness-values and a target brightness-value which is less than the first limit brightness-value,
wherein the representing brightness-value includes an average value or a median value of pixels included in each of the plurality of blocks.

* * * * *